(12) United States Patent  
Tabbert

(10) Patent No.: US 6,185,863 B1
(45) Date of Patent: Feb. 13, 2001

(54) BLOCK FOR STICKING NATURAL FLOWERS, BRANCHES AND THE LIKE

(75) Inventor: Jurgen Tabbert, Mannheim (DE)

(73) Assignee: Smithers-Oasis, Cuyahoga Falls, OH (US)

(*) Notice: Under 35 U.S.C. 154(b), the term of this patent shall be extended for 0 days.

(21) Appl. No.: 09/155,999
(22) PCT Filed: Feb. 10, 1998
(86) PCT No.: PCT/EP98/00738
  § 371 Date: Mar. 8, 1999
  § 102(e) Date: Mar. 8, 1999
(87) PCT Pub. No.: WO98/34466
  PCT Pub. Date: Aug. 13, 1998

(30) Foreign Application Priority Data

Feb. 10, 1997 (DE) .......................................... 297 02 149 U

(51) Int. Cl.⁷ .................................. A01G 5/00; A47G 7/00
(52) U.S. Cl. .......................... 47/41.12; 47/41.01; 47/64; 47/59
(58) Field of Search .................. 47/41.01, 41.12, 47/64, 59

(56) References Cited

U.S. PATENT DOCUMENTS

| | | | |
|---|---|---|---|
| 3,877,172 | * | 4/1975 | Schwab et al. ...................... 47/41.01 |
| 4,034,506 | * | 7/1977 | Kasahara et al. ......................... 47/64 |
| 4,034,507 | * | 7/1977 | Dedolph .................................. 47/66 |
| 4,420,903 | * | 12/1983 | Ritter et al. .......................... 47/41.01 |
| 4,908,986 | * | 3/1990 | Rowland et al. ......................... 47/80 |

FOREIGN PATENT DOCUMENTS

| | | | |
|---|---|---|---|
| 73 34 810 | 12/1973 | (DE) | .................................. 47/41.01 |
| 296 20 506 | 1/1997 | (DE) | .................................. 47/41.01 |
| 297 02 149 U | 4/1997 | (DE) | .................................. 47/41.01 |

* cited by examiner

Primary Examiner—Peter M. Poon
Assistant Examiner—Judith A. Nelson
(74) Attorney, Agent, or Firm—Renner, Kenner, Greive, Bobak, Taylor & Weber

(57) ABSTRACT

A block is made of a hydrophilic or hydrophobic plastic foam body (1) into which natural flowers, branches, twigs, fruit or the like can be stuck and held. The plastic foam body (1) is provided with a water-tight casing (2) made of plastics or lacquers. A water storage space (3) connected with the outside through a filling pipe (4) is provided in the bottom area of the block between the casing (2) and the plastic foam body (1).

5 Claims, 1 Drawing Sheet

BLOCK FOR STICKING NATURAL FLOWERS, BRANCHES AND THE LIKE

Figure 1:
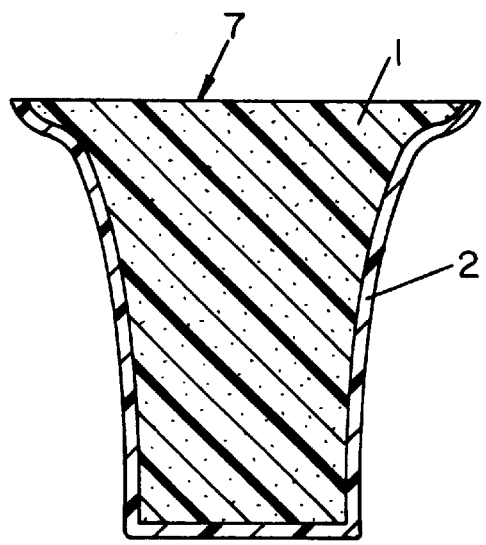

The invention is a floral foam base made of hydrophilic or hydrophobic plastic foam for the arrangement of natural flowers, twigs, branches, fruits as well as decoration material, providing the foam base with a waterproof coating made of resins and lacquers.

Such a floral foam base will be combined with a bowl or other plastic fixings after shaping as desired, e.g. bars, spheres for bouquet holder, wreathes, etc. In most cases wire cages or other fixings are used to connect the floral foam and the bowl. Instead of plastics bowls or cages parts of biodegradable material will be used.

The main disadvantage of these well-known types is, that for the various shapes the corresponding molds must be available which causes considerable costs. Additional work is necessary to connect the foam bases with the bowls.

The subject matter of the invention is to create such a foam base in that way that an additional fresh water supply guarantees long freshness of natural plants.

This problem will be solved by a water storage space on the bottom area between coating and floral foam, connected with the outside by a filling pipe.

It is also an advantage to provide the foam base with a concavity within the non-coated area.

The invention especially has the advantage to have a one-piece product with high stability of the connection. All shapes and sizes can be manufactured easily by cutting and sawing. The entire product is biodegradable and is stabilized by the coating.

Figure 2:
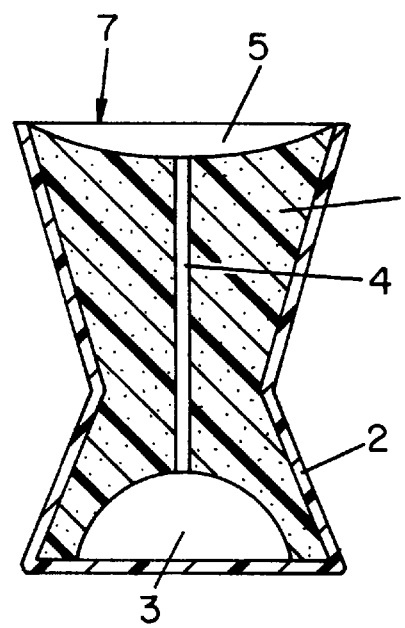
Figure 3:
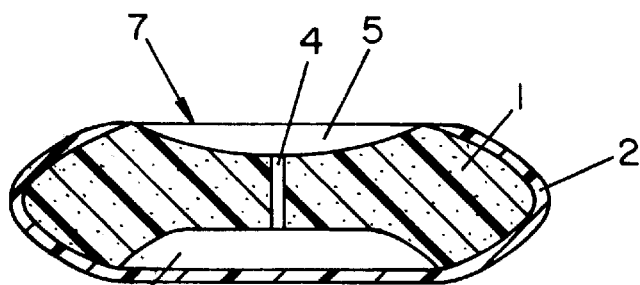

The invention is described in detail and show in the drawings as follows:

FIG. 1: is a sectional view through a prototype of such a coated foam base;

FIG. 2: is another type of the product;

FIG. 3: is a third type;

FIG. 1 shows a vase-shaped foam object as holder for various natural and artificial flowers, twigs, branches, fruits and decoration material. The different shapes and sizes of this foam base can be formed easily by cutting or sawing.

This shaped foam base (1) will be covered with a waterproof plastic coating, e.g. acrylics, resins, etc. This coating (2) will be done by spraying or dipping. The thickness of the coating (2) can vary between 0.5 to 10 mm, depending on respective application.

The object shown in FIG. 2 has a water reservoir (3) on the bottom area which is made by a recess of the foam base (1). The reservoir (3) is connected by a filling pipe (4) with the upper side of the vase-shaped object as the upper filling point. In addition there is a concavity (5) within the area of the upper opening (7) without coating (2), which is connected with the water reservoir (3) by the filling pipe (4).

The designs shown in FIGS. 1 and 2 are especially suitable for the production of vases. The flowers, twigs, etc. can be inserted in the area of the upper opening (7). By the capillary effect the flowers, twigs, etc. will be additional provided with water as long as the reservoir is filled with water.

The additional type shown in FIG. 3 is a wide flat product. The coating (2) supports the stability of the foam body (1) in order to ensure the requested handling.

What is claimed is:

1. A foam base of hydrophilic or hydrophobic material to arrange natural flowers, twigs, branches, fruits and decoration material, having a foam body at least partially covered with a waterproof coating of resins and lacquers, comprising at least one water reservoir between the coating and the foam body, wherein the reservoir is located in the bottom area of the foam body; and a filling pipe formed in the foam body and opening externally thereof, wherein said filling pipe communicates with said reservoir.

2. A foam base according to claim 1, wherein the foam body is partly covered with a coating on its surface, defining a non-coated area of the foam-body wherein the foam body has a concavity in the non-coated area.

3. A foam base according to claim 2, wherein the concavity is in communication with said filling pipe.

4. A foam base according to claim 1, further comprising a non-coated upper opening in communication with the reservoir by said filling pipe.

5. A foam base according to claim 4, wherein the foam body defines a concavity about the upper opening, wherein the concavity is fluidly connected to the reservoir by said filling pipe.

* * * * *